United States Patent
Taylor

(10) Patent No.: US 9,230,435 B2
(45) Date of Patent: Jan. 5, 2016

(54) DRIVER CONTROLLABLE TRAFFIC SIGNAL

(71) Applicant: HTI IP, LLC, Atlanta, GA (US)

(72) Inventor: Thomas S. Taylor, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 81 days.

(21) Appl. No.: 14/165,709

(22) Filed: Jan. 28, 2014

(65) Prior Publication Data

US 2015/0213713 A1    Jul. 30, 2015

(51) Int. Cl.
*G08G 1/01* (2006.01)
*G08G 1/087* (2006.01)

(52) U.S. Cl.
CPC .............. *G08G 1/087* (2013.01); *G08G 1/0125* (2013.01)

(58) Field of Classification Search
CPC .............................. G08G 1/087; G08G 1/0125
USPC ................... 340/902, 906, 907, 904; 701/117
See application file for complete search history.

(56) References Cited

U.S. PATENT DOCUMENTS

| | | | |
|---|---|---|---|
| 6,917,306 B2 * | 7/2005 | Lilja ............................ | 340/903 |
| 2006/0273923 A1 * | 12/2006 | Schwartz ..................... | 340/906 |
| 2011/0169661 A1 * | 7/2011 | Eichhorst ..................... | 340/906 |
| 2011/0193722 A1 * | 8/2011 | Johnson ....................... | 340/906 |
| 2012/0218126 A1 * | 8/2012 | Roberts et al. ............... | 340/906 |
| 2012/0326890 A1 * | 12/2012 | Cross ........................... | 340/906 |
| 2013/0300583 A1 * | 11/2013 | Wignot et al. ............... | 340/907 |
| 2013/0321174 A1 * | 12/2013 | Eichhorst ..................... | 340/917 |
| 2014/0125498 A1 * | 5/2014 | Curry et al. .................. | 340/906 |

* cited by examiner

*Primary Examiner* — Daniel Wu

(57) ABSTRACT

Traffic at an intersection, or other portion of a road, is detected, and the stop/go traffic signal apparatus at the intersection, or other portion is controlled based on vehicle types in the detected traffic. A vehicle type may be determined based on information collected by that vehicle's onboard telematics unit, or with a user's device in communication therewith. An input may be received from a user device, onboard the vehicle, to request changing the current stop/go configuration of the traffic signal. The request may be processed based on the determined vehicle type to determine whether or not to change the traffic signal in response to the request. The request may be accompanied by an offer of money, and if the request is not granted, the user device may forward another request associated with a different offer.

20 Claims, 12 Drawing Sheets

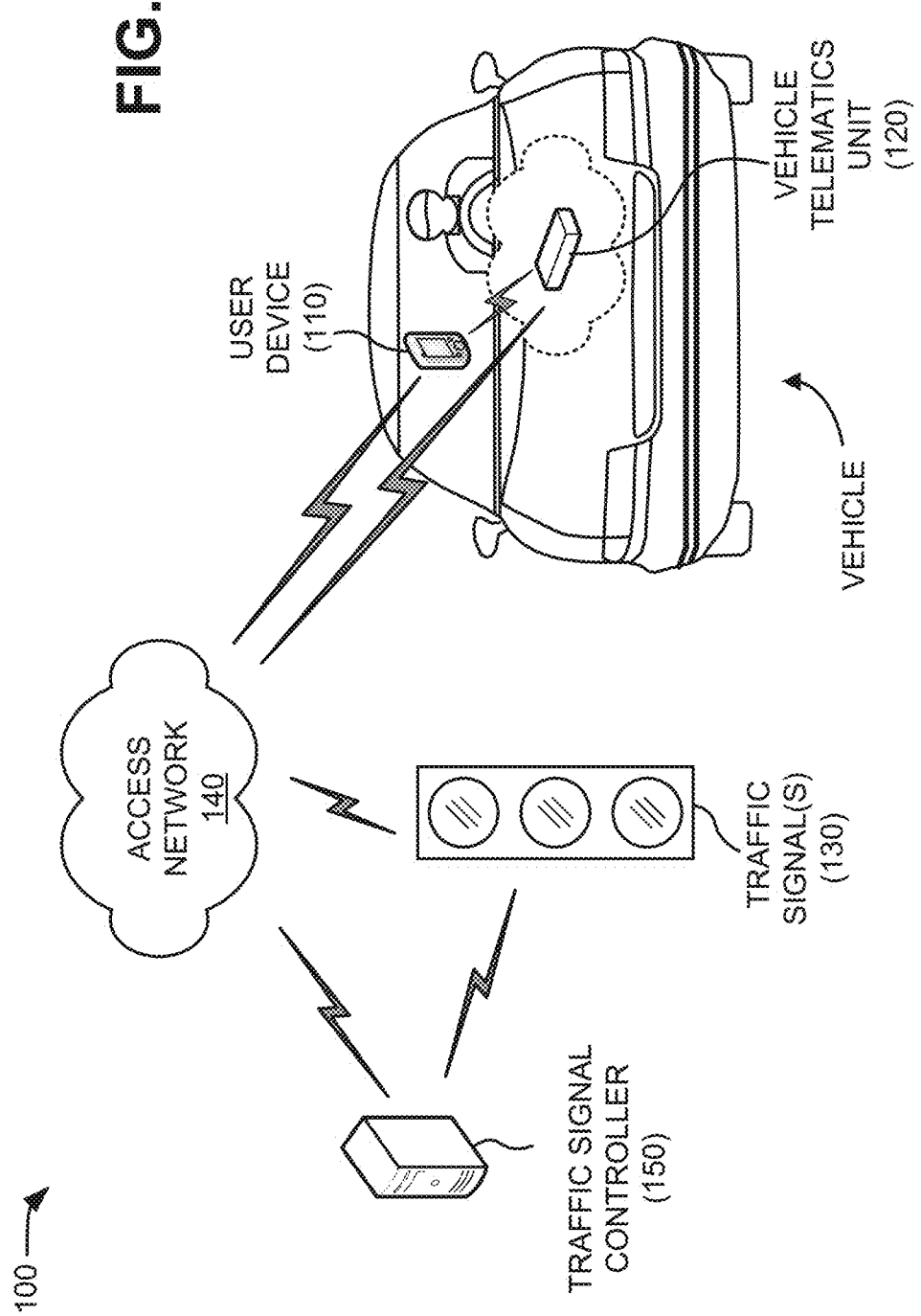

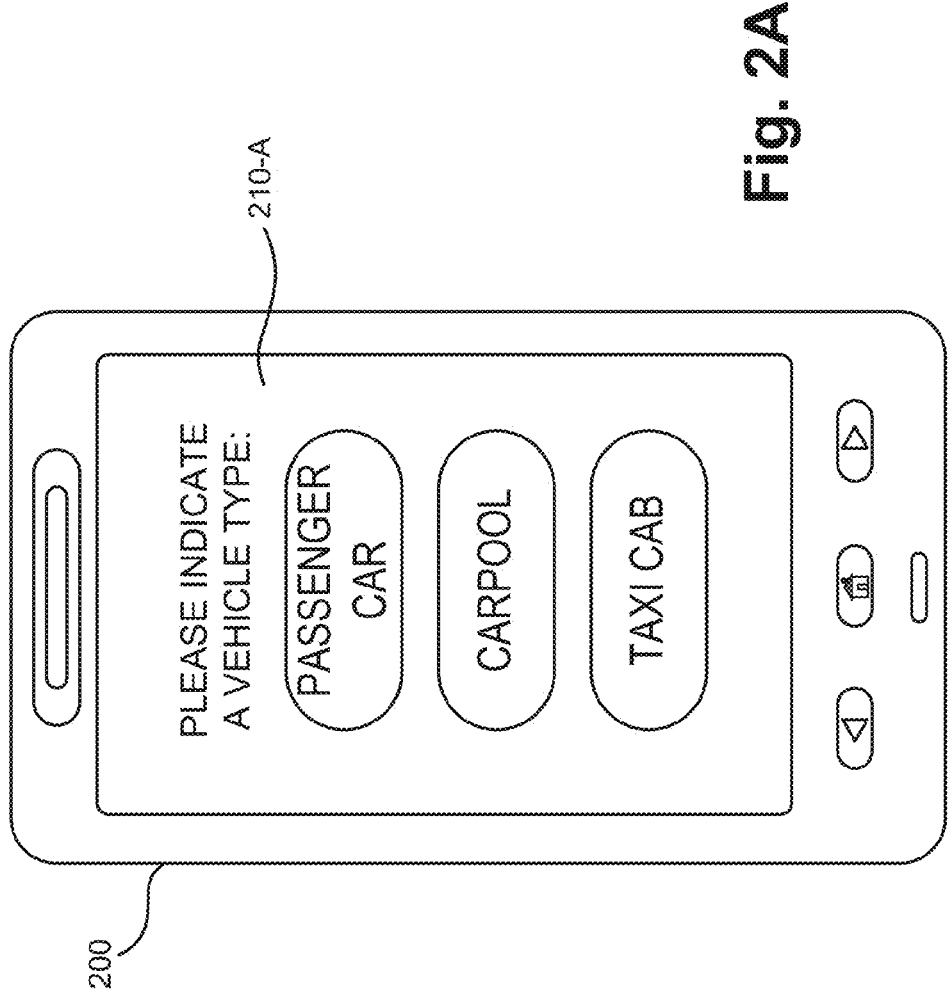

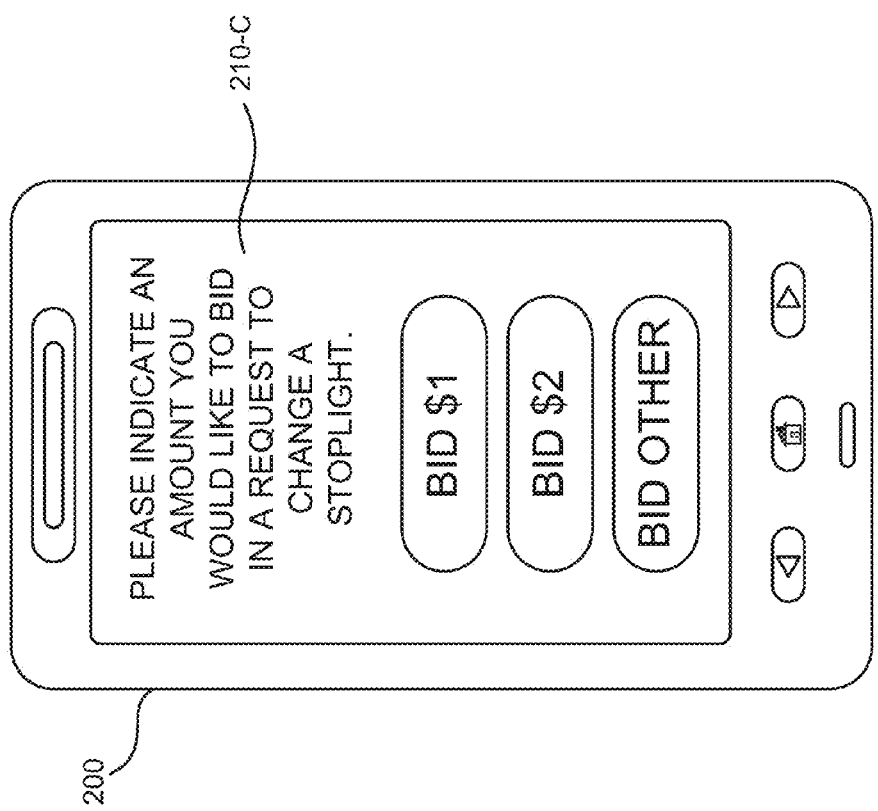

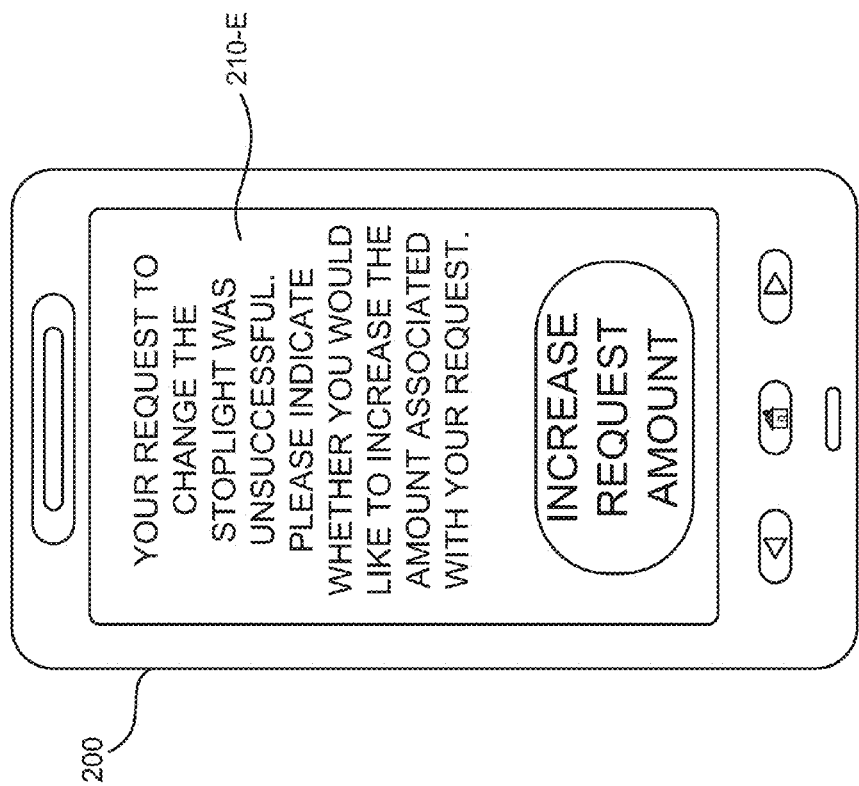

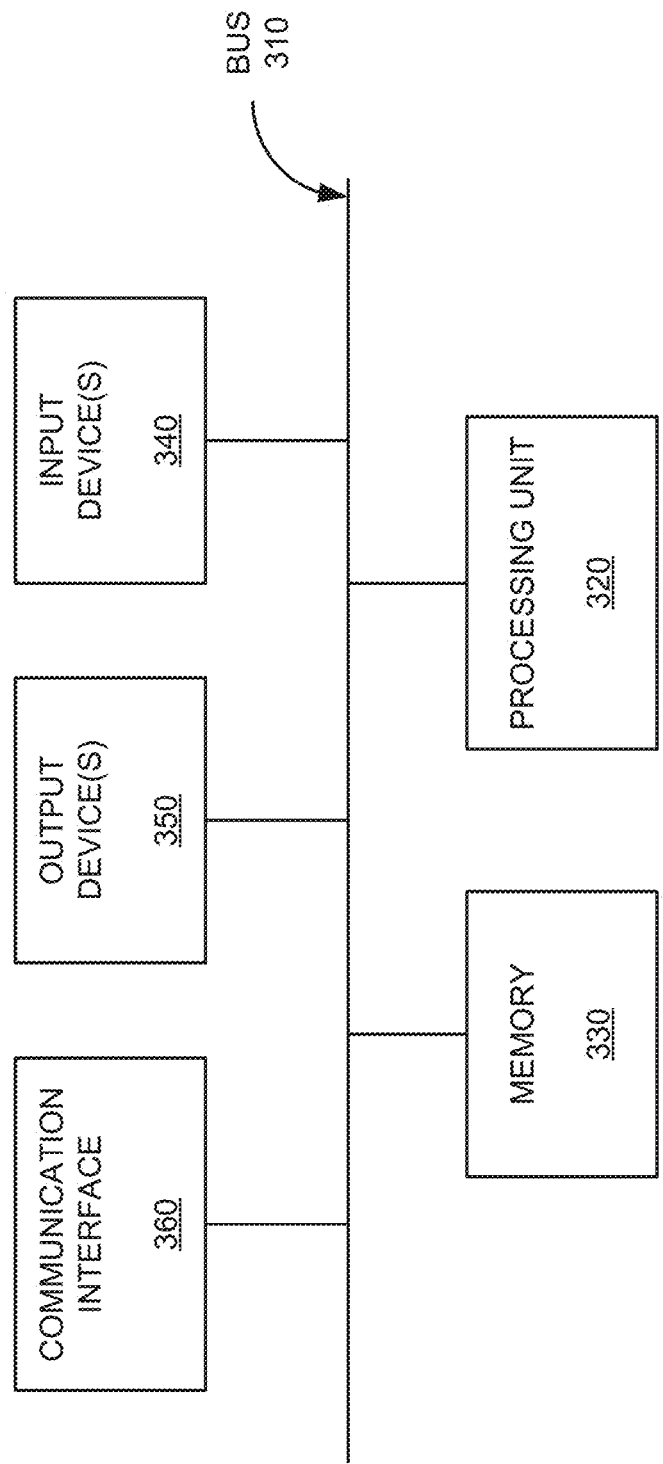

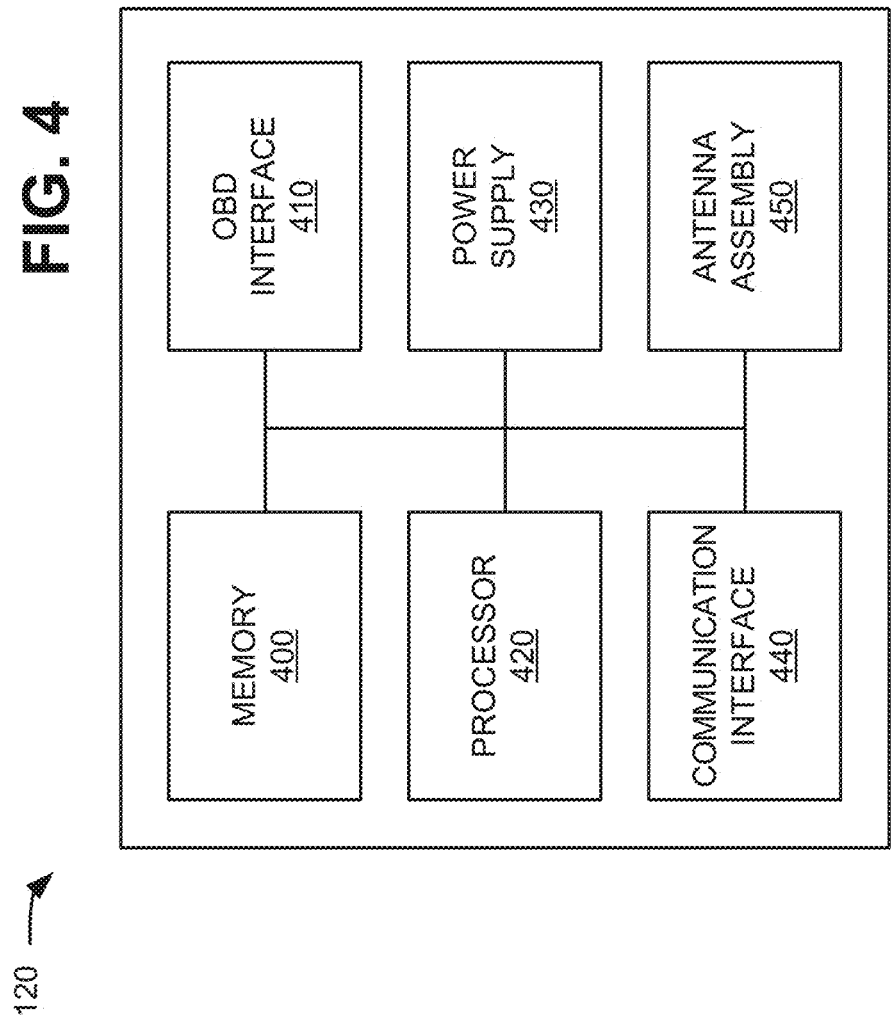

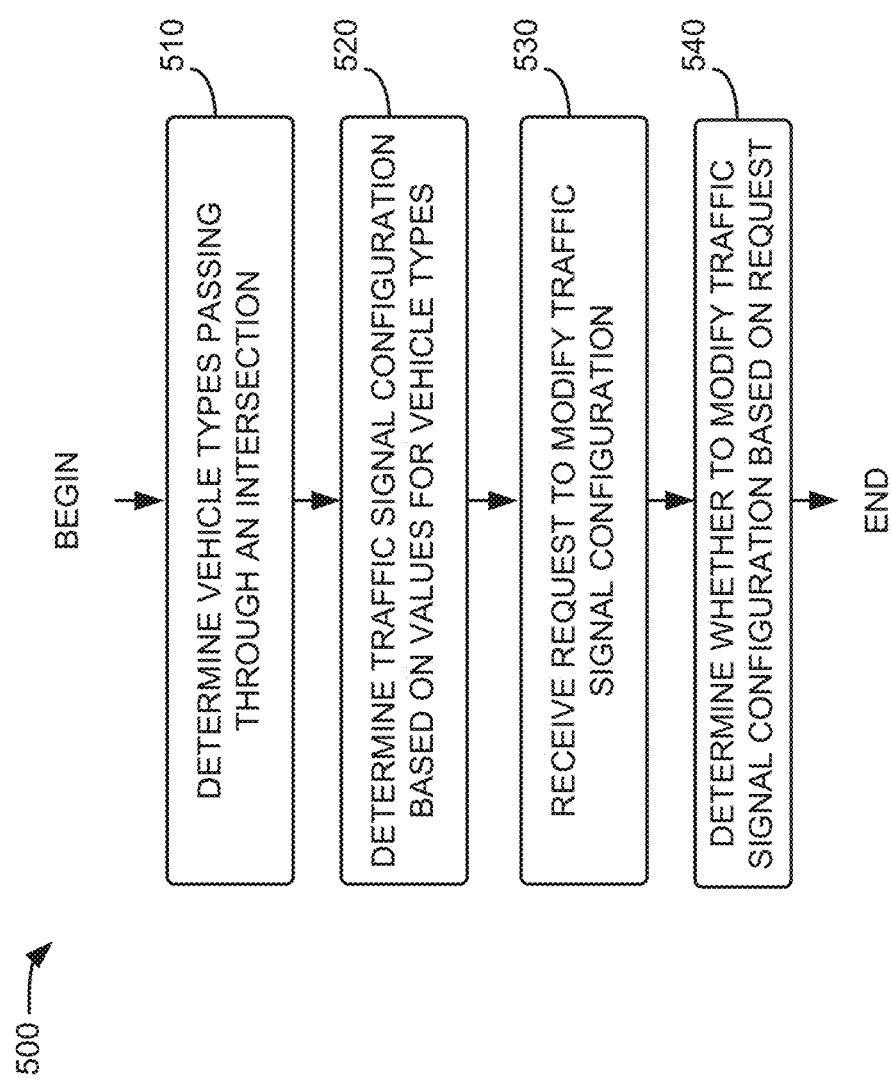

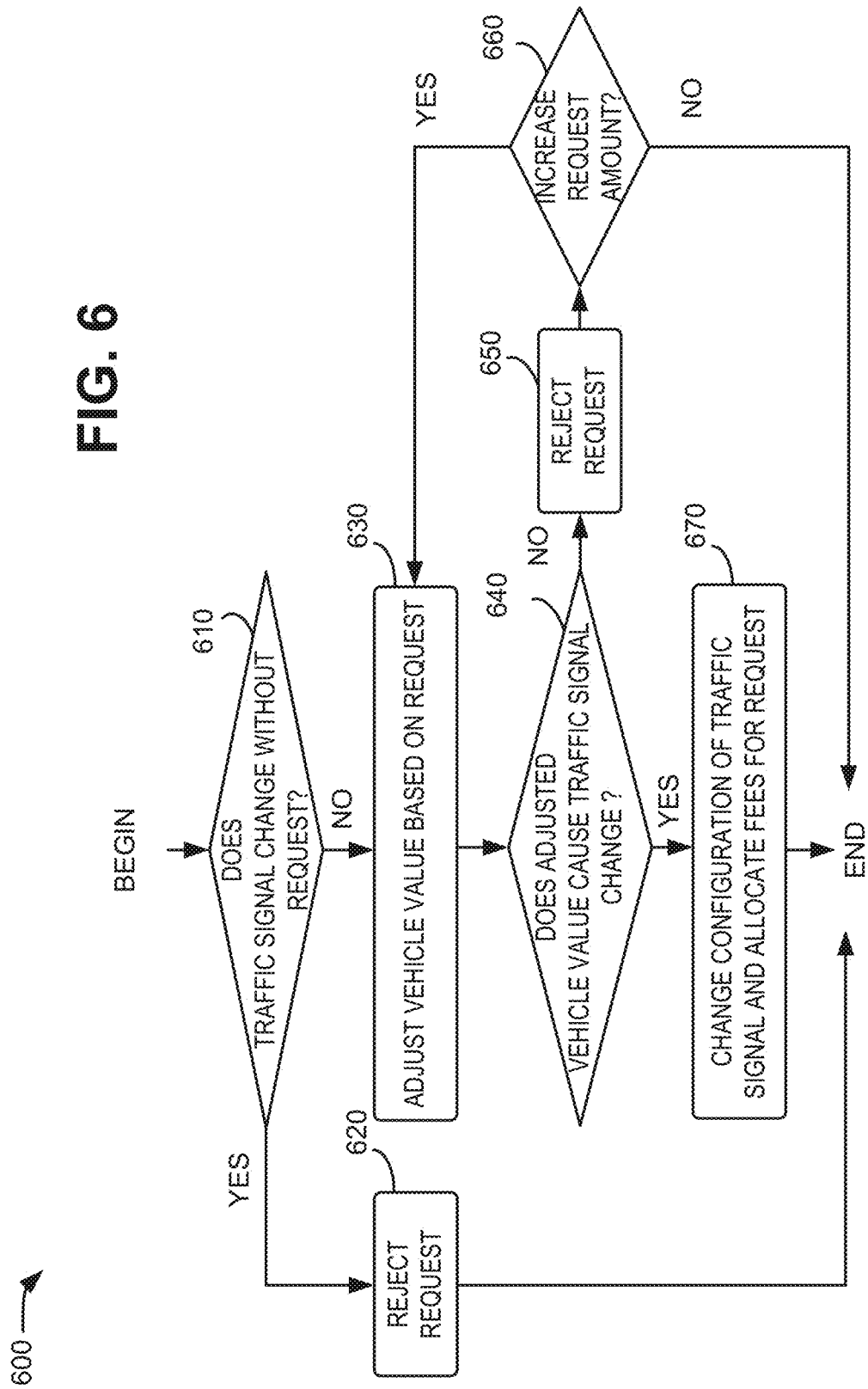

FIG. 7

| VEHICLE TYPE (710) | VEHICLE VALUE (720) | ADDITIONAL VEHICLE VALUE (730) |
|---|---|---|
| PASSENGER CAR | 1 | 1 |
| CARPOOL | 4 | 1 |
| BUS | 20 | 20 |
| VAN | 3 | 2 |
| EMERGENCY VEHICLE | 1000000 | 1000000 |

700

DRIVER CONTROLLABLE TRAFFIC SIGNAL

BACKGROUND

Traffic signals, also known as traffic lights, traffic lamps, signal lights, stop lights, or traffic control signals, are signaling devices positioned at road intersections to control competing flows of traffic. Traffic signals typically alternate the movement of the flows of vehicles by displaying lights of standard colors (e.g., red, yellow, and green). Traffic signals may use timers to implement fixed intersection cycling times. For example, a first traffic flow travelling in a particular direction may be permitted to pass through an intersection during a first time period and may be stopped during a second time period. The cycling times may vary based on the time of day and day of the week, or for other special circumstances such as a major event.

Traffic signals may be dynamically controlled based on detected traffic patterns. The traffic patterns may be detected, for example, using pressure sensors in a road or other vehicle sensors. Traffic signals may give more time to a traffic flow associated with heavy traffic, and the traffic signals may shorten or even skip another traffic flow that has little or no traffic waiting.

Traffic signals may give priority to special traffic, particularly emergency vehicles such as fire trucks, ambulances, and police cars. For example, a traffic signal may include a sensor to receive a radio-frequency signal and/or sounds transmitted by an emergency vehicle and may change based on detecting the emergency vehicle.

BRIEF DESCRIPTION OF THE DRAWINGS

FIG. 1 depicts an exemplary environment in which systems and/or methods described herein may be implemented;

FIGS. 2A-2F show exemplary displays that may be presented by a device in connection with receiving a user input related to identifying a vehicle type and/or a requesting a change to a traffic signal;

FIG. 3 is a diagram of exemplary components of the device included in the environment depicted in FIG. 1;

FIG. 4 is a diagram of exemplary components of a vehicle telematics unit of the environment depicted in FIG. 1;

FIGS. 5 and 6 are flow charts of exemplary process for controlling a traffic signal based on types of vehicles being directed by the traffic signal;

FIG. 7 shows an exemplary table that may be stored by a traffic signal controller included in the environment depicted in FIG. 1.

DETAILED DESCRIPTION

Figure 2B:
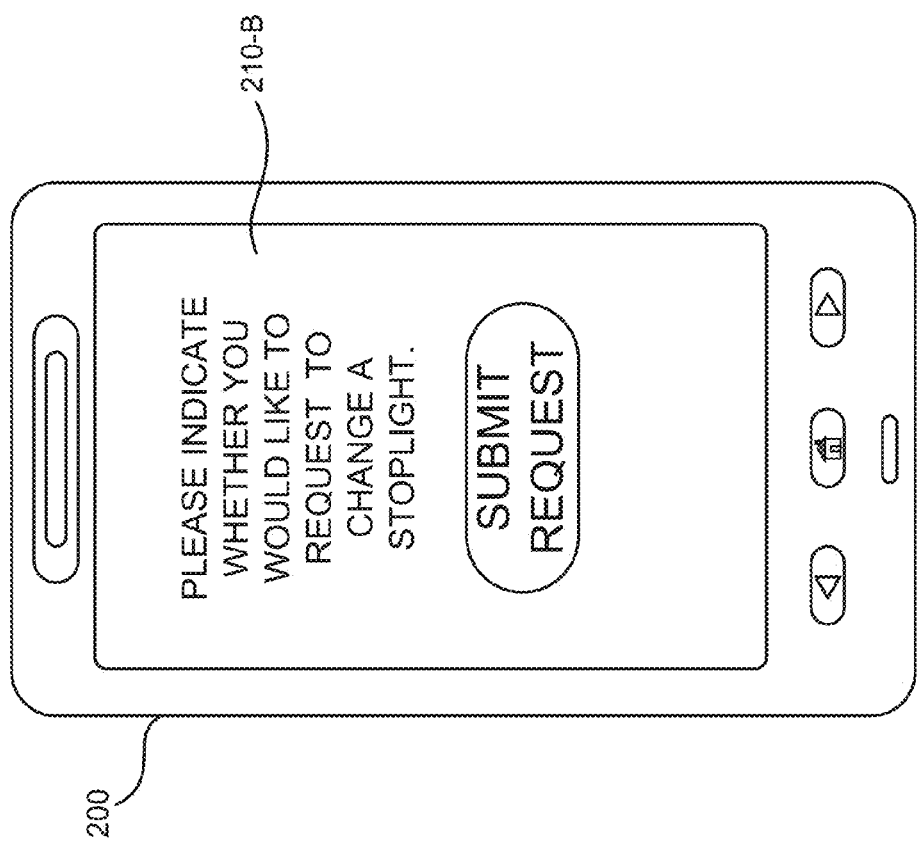

The following detailed description refers to the accompanying drawings. The same reference numbers in different drawings may identify the same or similar elements.

Systems and methods described herein relate to dynamically detecting traffic at an intersection and controlling one or more traffic signals at the intersection based on the detected traffic. For example, types and quantities of vehicles passing through different portions of an intersection may be determined, and the traffic signals may be programmed to efficiently control movement of the traffic through the intersection. In one implementation, the traffic signals may be controlled to prioritize the movement of certain types of vehicles through the intersection. For example, vehicles carrying multiple people (such as buses and/or car pools) may be identified, and the traffic signals at an intersection may be controlled to minimize a per-person delay and/or a per-vehicles delay through the intersection. In addition or alternatively, some types of vehicles, such as public safety vehicles (e.g., police cars, fire trucks, or ambulances) may be identified, and the traffic signals may be dynamically controlled to expedite movement of the public safety vehicles.

The vehicle type may be determined based on data received from a user device, such as a smart phone, associated with a vehicle (e.g., used by a person in the vehicle; the phone may be used in a safe manner, e.g., either by a non-driver at any time or by the driver directly while the vehicle is stopped such as at a traffic light intersection or, if the vehicle is moving, by the driver pushing a button on the dashboard in the vehicle which activates the phone to transmit the signals intended, thereby allowing the driver to be in full control of the vehicle at all times). The data may include information identifying the vehicle type (e.g., authenticating information identifying a public safety vehicle) or information associated with a configuration or performance of the vehicle that may be used to infer the vehicle type. The data may include, for example, information collected by a vehicle telematics unit associated with the vehicle coupled to a communication bus of the vehicle.

In one implementation, an input may be received via the user device (i.e., operating a button or switch of the vehicle or by operating a button, slider, or other similar control of a user interface of a device, such as a smart phone) to request, perhaps in exchange for paying a fee, modification of a traffic signal. The request may be processed to determine whether to change a traffic signal in response to the request. The request may be processed based on the determined vehicle type associated with the user device. For example, a request received from a public safety vehicle may be more likely to cause a traffic signal to change relative to a request from a passenger car. If a request is unsuccessful (e.g., the traffic signal does not change in response to the request), the user device may forward another request (e.g., offering to pay a higher fee).

FIG. 1 is an exemplary environment 100 in which systems and/or methods described herein may be implemented. As illustrated in FIG. 1, environment 100 may include, for example, a vehicle including a user device 110 and a vehicle telematics unit 120, traffic signal(s) 130, a network 140, and a traffic signal controller 150. Traffic signal apparatus 130 may be located at a road intersection and traffic signal controller 150 may be located near or with traffic signal 130 or may be located remotely (e.g., connected via network 140. Devices and/or networks of network environment 100 may interconnect via wired and/or wireless links.

User device 110 may include a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices.

User device 110 may be capable of communicating via a local wireless network, to vehicle telematics unit 120 to collect information identifying a vehicle type; i.e., user device 110 may identify the type of its host vehicle, such as the vehicle in which it is being transported. User device 110 may employ one or more short-range wireless communication standards to communicate with vehicle telematics unit 120. User device 110 may employ, for example, IEEE 802.15 (e.g., Bluetooth®) discovery protocols or Bluetooth®-derivative protocols, although other local wireless network protocols that enable passive device discovery may be used.

User device 110 may determine a vehicle type based on the data collected by vehicle telematics unit 120. In one implementation, user device 110 may determine a current usage of a vehicle (i.e., its host vehicle) based on the data collected from vehicle telematics unit 120, and may identify a vehicle type based on the usage. For example, if the collected data indicates that a public safety vehicle is traveling at more than a threshold speed, it may be implied that the public safety vehicle is responding to an emergency situation and should, therefore, be prioritized by traffic signal 130. Conversely, if the collected data indicates that the public safety vehicle is traveling at less than the threshold speed, the public safety vehicle may not be responding to an emergency situation and, therefore, should not be prioritized by traffic signal 130.

In another implementation, user device 110 may further receive input from a user identifying the vehicle type associated with, or transporting, the user. For example, the user may specify whether a passenger car is being used by only a single driver or is also being used to transport additional passengers (such as a car pool). In another example, a driver of a public safety vehicle may indicate whether a public safety vehicle is traveling toward an emergency situation.

In certain implementations (described in greater detail below with respect to FIGS. 2B-2F), user device 110 may provide an interface, such as a graphical user interface (GUI), to receive one or more inputs associated with a request to change a traffic signal. The interface, provided via user device 110, may further present information associated with processing of the request, such as whether the request was accepted.

User device 110 may communicate (e.g., via network 140) with traffic signal controller 150 to forward information identifying the vehicle type and/or data associated with a request to change a traffic signal to traffic signal controller 150. User device 110 may also receive information from traffic signal controller 150 indicating, for example, whether the request is successful.

Vehicle telematics unit 120 may include a data collection system configured for installation in a vehicle. For example, vehicle telematics unit 120 may receive data generated by vehicle sensors and/or a vehicle electronic control unit (ECU). An ECU may transmit status and diagnostic information over a shared, standardized electronic bus in the vehicle. The bus effectively functions as an on-board computer network, with many processors transmitting and receiving data via the bus. Data available from the ECU may include vehicle speed, fuel level, engine temperature, intake manifold pressure, etc. Vehicle telematics unit 120 may include a component for communicating over network 140. Vehicle telematics unit 120 may also be capable of communicating with user device 110 via a short-range wireless network.

Environment 100 may include one or more traffic signals 130. A traffic signal 130 may include one or more light sources, such as light bulbs or light emitting diodes, to output optical energy in various colors associated with directing flows of traffic. The light sources may operate according to a light timing cycle that may determined based on detected traffic conditions, such as a volume of vehicles and the associated vehicle types.

Network 140 may include a communications network that connects user device 110, vehicle telematics unit 120, traffic signal 130, and/or traffic signal controller 150. Network 140 may include a local area network (LAN), a wide area network (WAN), a metropolitan area network (MAN), a wireless network, an optical fiber (or fiber optic) network, or a combination of networks. In one implementation, network 140 may include an IP-based network. In some implementations, network 140 may be a private network controlled by, for example, a telecommunications company that provides telephone and/or data access to vehicle telematics unit 120. In another implementation, network 140 may be a public network, such as the Internet, or a combination of public and private networks.

Network 140 may include at least one radio network capable of supporting wireless communications to/from vehicle telematics unit 120. The radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless network standards.

In another implementation, network 140 may include, for example, one or more private Internet Protocol (IP) networks that use a private IP address space. Network 140 may include a local area network (LAN), an intranet, a private wide area network (WAN), etc. In one implementation, network 140 may implement one or more virtual private networks (VPNs) for providing communication between devices within network 140. Network 140 may be protected/separated from other networks by a firewall (not shown). Although shown as a single element in FIG. 1, network 140 may include a number of separate networks.

Traffic signal controller 150 may include one or more computation or communication devices that gather, process, search, and/or provide information in a manner described herein. In one exemplary implementation, traffic signal controller 150, located near or with traffic signal 130 may receive data from vehicle-based user device 110, vehicle telematics unit 120, and/or traffic signals 130 and store the information. For example, traffic signal controller 150 may receive vehicle type information from user device 110 and/or vehicle telematics unit 120. Alternatively, traffic signal controller 150 is located remotely from traffic signal 130 and may receive data from vehicle-based user device 110, vehicle telematics unit 120, and/or traffic signals 130 via network 140.

Traffic signal controller 150 may control traffic signals 130 based on the information received from user device 110, vehicle telematics unit 120, and/or traffic signals 130. For example, traffic signal controller 150 may receive status information regarding traffic signals 130 and may selectively change traffic signals 130 to maximize a number of people and/or vehicles passing through an intersection. Traffic signal controller 150 may also selectively change traffic signals 130 based on other criteria, such as to achieve delays that are less than a threshold time period and/or to reduce an average delay per vehicle and/or per person. In another implementation, traffic signal controller 150 may also control traffic signals 130 to minimize delays to a public safety vehicle, a vehicle carrying one or more public figures, or a vehicle carrying one, or more, private individuals for whom a preference fee has been paid to permit expeditious passage through a plurality of traffic control devices along a route and/or through an intersection controlled by a traffic control device (e.g., to facilitate passage of a sports figure's vehicle, or a sports team bus, on the way to a game).

In one example, traffic signal controller 150 may provide an interface, such as a web page, to receive data from user device 110. For example, traffic signal controller 150 may provide an entry point for secure web portal for customers. Additionally, or alternatively, traffic signal controller 150 may provide a web-based application that user device 110 may use to submit data associated with, for example, its vehicle type or associated with a request to change the traffic-flow status imposed by traffic signal 130. In another implementation, the web-based application may include a utility to automatically collect information from user device 110, such as payment information related to the request.

Traffic signal controller 150 may store data pertaining, for example, to a vehicle type associated with user device 110 and/or other vehicles, data collected from vehicle telematics unit 120, operation of traffic signals 130, etc.

In FIG. 1, the particular arrangement and number of components of network environment 100 are illustrated for simplicity. In practice there may be more user devices 110, vehicle telematics units 120, traffic signals 130, networks 140, and/or traffic signal controller 150. For example, environment 100 may include numerous user devices 110 and/or vehicle telematics units 120 associated with numerous vehicles. This situation may correspond, for example, to determining types associated with multiple vehicles passing through an intersection in a traffic flow. In another example, environment 100 may include multiple traffic signals 130 such that traffic signal controller 150 may coordinate traffic flows through multiple intersections. For example, a successful request to change a first traffic signal 130 at a first location may also cause traffic signal controller 150 to also change another traffic signal 130 located elsewhere at a different location (e.g., at a different intersection).

Furthermore, functions described as being performed by a single component in environment 100 may be performed by multiple separate components, and functions described as being performed by multiple components in environment 100 may be performed by a fewer components. For example, traffic signal controller 150 may be included as a component in traffic signal 130.

FIGS. 2A-2F show exemplary displays 210-A through 210-F that may be presented by user device 110 in connection with receiving a user input related to identifying a vehicle type and/or a requesting a change to a traffic signal 130.

In the example shown in FIG. 2A, user device 110 may present a display 210-A prompting a user to submit an input to identify a vehicle type associated with a user device 110. In the example shown in FIG. 2A, display 210-A may prompt a user to select (e.g., touch a corresponding area of a touch screen, select with a mouse, press a button, manually submit, etc.) a "Passenger Car" type, a "Carpool" type, or a "Taxi Cab" type. As described in greater detail below, a traffic signal 130 may be configured based on the selected vehicle type. The particular options presented in display 210-A may be generated based on information regarding the associated vehicle (e.g., asking the user to select from among the "Passenger Car" type, the "Carpool" type, or the "Taxi Cab" type based on determining that user device 110 is associated with a sedan.

In the example shown in FIG. 2B, user device 110 may present a display 210-B that allows the user to submit a request (or bid) to change a traffic signal. Display 210-B provides the user with an option to select a "Submit Request" message. An amount associated with the request may be fixed, vary based on a vehicle type associated with the user, may be configured by the user, etc.

In another implementation shown in FIG. 2C, user device 110 may present display 210-C indicating that the user may submit different inputs to select from among different bid amounts. In the example shown in FIG. 2C, display 210-C indicates that the user may select a first area corresponding to a "Bid $1" message; a second area corresponding to a "Bid $2" message; or a third area corresponding to a "Bid Other" message. The amounts shown in display 210-C may be determined based on, for example, the vehicle type associated with the user device 110, other inputs submitted via user device 110, prior requests, amounts associated with requests by other users, etc.

If the request is accepted, the stoplight changes in response to submission of the request and the user may be charged for the amount associated with the request (e.g., the bid amount). The request may be rejected and the associated amount is not charged to the user if, for example, the stoplight changes without influence by the request. For example, the request may be rejected if the stoplight was already scheduled to change prior to the submission of the request. The request may also be rejected when the request is unsuccessful to change the stoplight. For example, the request may be unsuccessful when the request amount is insufficient to change the stoplight (e.g., if another user travelling in another direction submits a higher bid to prevent the light from changing). In another situation, the request may be rejected and the stoplight may be configured to expedite movement of certain types of vehicles travelling in another direction. For example, the request may be rejected so that that the stoplight expedites movement of emergency vehicles, public transportation vehicles, and/or high occupancy vehicles carrying multiple passengers. In another aspect, cameras mounted at a given intersection, or along a particular road section, may relay images of the vehicle for which expedited passage is requested, and automatic review, or manual review by personnel at a central monitoring facility, may determine that the vehicle corresponding to the request, does not correspond to the vehicle type included in the request message. In such a scenario, the central monitoring facility, either automatically using computer equipment, or manually by monitoring personnel, may deny the request and generated and send a reply message to the requesting device, indicating the denial.

User device 110 may provide a visual indication regarding whether the request (submitted, for example, via display 210-B or display 210-C) was successful to change the stoplight. In the example shown in FIG. 2D, a first message ("Your Request Was Successful, and the Stoplight Will Change Based on Your Request.") may be presented to indicate that the request was accepted. In the example shown in FIGS. 2E and 2F, user device 110 may present a second, different message ("Your Request to Change the Stoplight was Unsuccessful") when the request was not accepted. In another implementation, user device 110 may provide a non-textual response, such as displaying a graphical indication (e.g., color and/or symbol) or providing an audio response (e.g., a verbal response or other non-verbal indication).

Figure 2D:
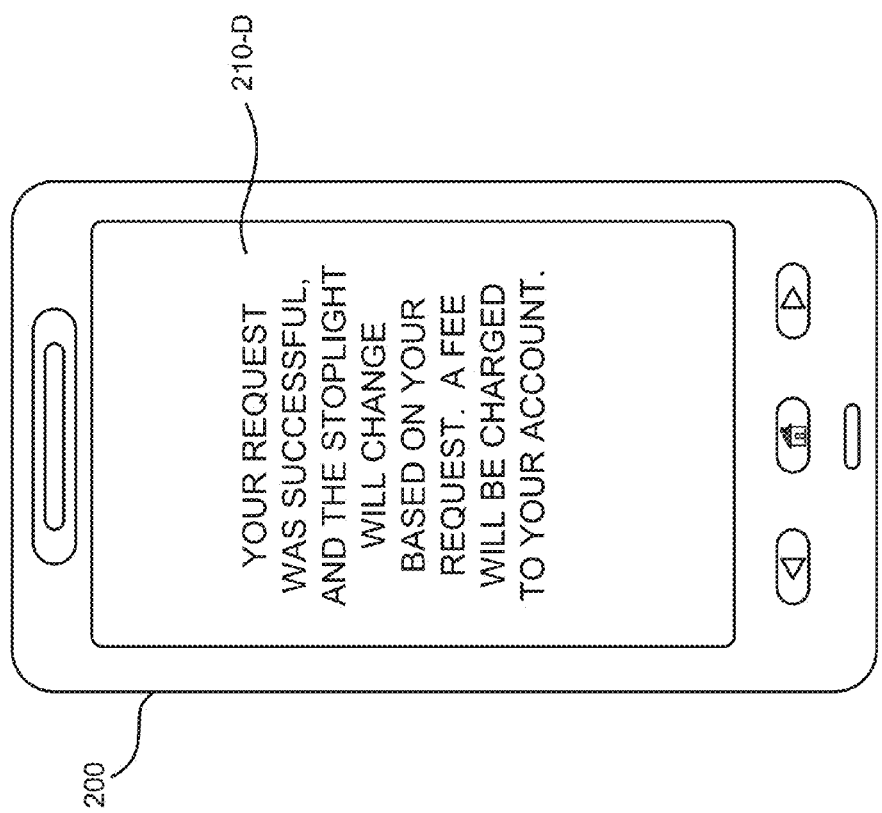

In the example shown in FIG. 2D, display 210-D may also further indicate that the associated amount will be charged the user (e.g., "A Fee Will Be Charged to Your Account") in connection with the successful request. User device 110 may further provide information regarding changes in the status of the stoplight in response to the successful request. For example, user device 110 may provide information identifying a time when the stoplight is expected to change based on the successful request (not shown).

In the example shown in FIG. 2E, display 210-E may present a message ("Please Indicate Whether You Would Like to Increase the Amount Associated with Your Request.") indicating that the user may update a non-accepted request, such as to increase an amount associated with the request. Continuing with the example in FIG. 2E, display 210-E may prompt a user to select an "Increase Request amount" message if the initial request is unsuccessful.

Figure 2F:
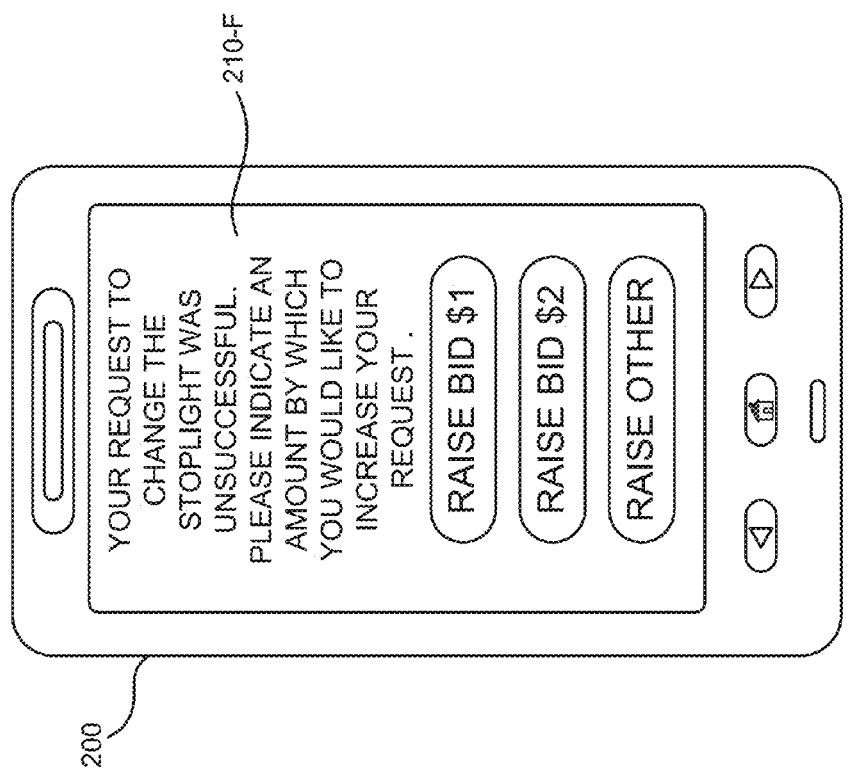

In another implementation shown in FIG. 2F, user device 110 may present display 210-F indicating that the user may submit different inputs to select from among different amounts to increase the request amount. In the example shown in FIG. 2F, display 210-F indicates that the user may select a first area corresponding to a "Raise Bid $1" message; a second area corresponding to a "Raise Bid $2" message; or a third area corresponding to a "Raise Other" message. The amounts shown in display 210-F may be determined based on, for example, the vehicle type associated with the user device 110, other inputs submitted via user device 110, prior requests, amounts associated with requests by other users, etc. It will be appreciated that computer equipment at a central monitoring facility could facilitate such an auction automatically, such that multiple vehicles competing for expedited favorable traffic control device operation might very rapidly, and automatically, bid up to a predetermined maximum bid. Or, rather than equipment at a central monitoring facility hosting an auction, user devices corresponding to vehicles with competing positions at a traffic control device could interact with each other and automatically determine the highest bidder and then the devices corresponding to the winning bid could deduct the winning bid amount from an account associated with the winning bid's device as payment for preferential traffic control device operation.

In one implementation, if the request is unsuccessful, user device 110 may present information (not displayed) identifying a minimum bid needed to successfully change the stoplight. In addition or alternatively, user device 110 may provide other information (not displayed) identifying an amount associated with a competing, successful request submitted by another user travelling in another direction of the stoplight.

In FIGS. 2A-2F, displays 210-A through 210-F are shown for simplicity and for exemplary purposes. In practice, displays 210-A through 210-F may present additional, different, or less information than shown in FIGS. 2A-2F. For example, displays 210-B through 210-F may present account information associated with user, such as an amount of money that is available to the user to bid in the request.

FIG. 3 is a diagram illustrating exemplary components of a device 300. Device 300 may correspond, for example, to user device 110 or traffic signal controller 150 and may be implemented/installed as a combination of hardware and software on one or more devices 300. As shown in FIG. 3, device 300 may include, for example, a bus 310, a processing unit 320, a memory 330, one or more input devices 340, one or more output devices 350, and a communication interface 360.

Bus 310 may permit communication among the components of device 300. Processing unit 320 may include one or more processors or microprocessors that interpret and execute instructions. In other implementations, processing unit 320 may be implemented as, or include, one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network environment 100. In one implementation, communications interface 360 may support short range wireless network communications (e.g., via Bluetooth protocols). In another implementation, communications interface 360 may support long range wireless network communications (e.g., cellular network services). In other implementations, communication interface 360 may support other wired or wireless network communications.

As described herein, device 300 may perform certain operations in response to processing unit 320 executing software instructions stored in a computer-readable medium, such as memory 330. A computer-readable medium may include a non-transitory tangible memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

FIG. 4 is a block diagram of exemplary components of vehicle telematics unit 120. As shown in FIG. 4, vehicle telematics units 120 may include a memory 400, an on-board diagnostics (OBD) interface 410, a processor 420, a power supply 430, a communication interface 440, and an antenna assembly 450.

Memory 400 may include a RAM, a ROM, and/or another type of memory to store data and instructions that may be used by processor 420.

OBD interface 410 may include a physical connector interface for use with a vehicle's on-board diagnostic systems. For example, OBD interface 410 may be configured to receive diagnostic and/or control information from a vehicle's OBD-II system or another on-board diagnostic system protocol. In one implementation, OBD interface may also receive power from the vehicle (e.g., a vehicle battery) to run vehicle telematics unit 120. Vehicle telematics unit 120 may also be directly coupled to the vehicle's communication bus, such as when a vehicle manufacturer installs the telematics unit when assembling the vehicle. In such installations, vehicle telematics unit 120 does not need to couple via an OBD-II connector.

Processor 420 may include one or more processors, microprocessors, application specific integrated circuits (ASICs), field programmable gate arrays (FPGAs), or other processing logic. Processor 420 may control operation of vehicle telematics unit 120 and its other components.

Power supply 430 may include one or more batteries or other power source components used to supply power to components of vehicle telematics unit 120. Power supply 430 may also include control logic to control application of power from an external power source (e.g., a vehicle battery) to one or more components of vehicle telematics unit 120.

Communication interface 440 may include a logical component that includes input and/or output ports, input and/or output systems, and/or other input and output components that facilitate the transmission of data from/to other devices. For example, communication interface 440 may include a network interface card (e.g., Ethernet card) for wired communications and/or a wireless network interface card for wireless communications. Communication interface 240 may also include WPAN interface. The WPAN interface may include a Bluetooth® interface or another wireless interface that allows vehicle telematics unit 120 to "pair up" and communicate wirelessly with other devices, such as user devices 110 that includes a Bluetooth interface. In another implementation, the WPAN interface may detect WPAN discovery signals from user device 110 (e.g., when user device 110 is in "discoverable" mode and proximate the vehicle) without actually pairing up. In other implementations, communication interface may also include a universal serial bus (USB) port for communications over a cable, a radio-frequency identification (RFID) interface, a near-field communications (NFC) wireless interface, and/or any other type of interface that converts data from one form to another form.

Antenna assembly 450 may include one or more antennas to transmit and/or receive RF signals over the air. Antenna assembly 450 may, for example, receive RF signals from communication interface 440 and transmit the signals over the air and receive RF signals over the air and provide them to communication interface 440.

Although FIG. 4 shows exemplary components of vehicle telematics unit 120, in other implementations, vehicle telematics unit 120 may include fewer components, different components, differently-arranged components, or additional components than those depicted in FIG. 4. Alternatively, or additionally, one or more components of vehicle telematics unit 120 may perform one or more other tasks described as being performed by one or more other components of vehicle telematics unit 120.

FIG. 5 is a flow chart of an exemplary process 500 for controlling or influencing a traffic signal 130 based on types of vehicles being directed or controlled by the traffic signal 130. In one implementation, process 500 may be performed by traffic signal controller 150. In other implementations, process 500 may be performed by one or more other devices of environment 100, such as user device 110 and/or vehicle telematics unit 120. Process 500 is described with reference to components in environment 100 shown in FIG. 1.

As shown in FIG. 5, process 500 may include determining vehicle types passing through an intersection (block 510). For example, as described above with respect to environment 100, traffic signal controller 150 may receive information collected by vehicle telematics unit 120 (e.g., received via user device 110 located in the vehicle or directly from vehicle telematics unit 120 via network 140). The data from vehicle telematics unit 120 may include information identifying its host vehicle type. For example, the data may specify whether the host vehicle is a car, a van, a bus, or a truck. Vehicle telematics unit 120 may also provide information identifying, for example, a make and/or model of the vehicle.

In another example, vehicle telematics unit 120 may provide a vehicle identifier, such as a vehicle identification number (VIN), and traffic signal controller 150 may determine a vehicle type associated with the vehicle identifier.

In another implementation, traffic signal controller 150 may receive information from user device 110 in transit inside the vehicle identifying the user device 110 (such as a telephone number or a serial number of the user device 110), an associated user (such as a name or an identifying number), or the vehicle (such as a license plate number). For example, traffic signal controller 150 may provide an interface (such as web page) through which the user may register user device 110 or the associated vehicle.

In another implementation, traffic signal controller 150 may determine information associated with the vehicle from another source. For example, traffic signal controller 150 may receive information from a vehicle presence sensor, such as a pressure sensor in a road. Traffic signal controller 150 may determine a weight of a vehicle based on readings from the pressure sensor. Traffic signal controller 150 may further use a series of readings from the pressure sensor to determine, for example, a wheel-base, a travel direction, and/or a velocity associated with the vehicle. Traffic signal controller 150 may also use the detected information (e.g., weight, wheelbase, etc.) to identify a make and/or model of the vehicle.

Traffic signal controller 150 may also use another type of sensor readings to detect the vehicle type. For example, an image sensor (e.g., a traffic camera) may capture optical data associated with the vehicle, and traffic signal controller 150 may process the optical data to identify the vehicle type based on, for example, the shape, size, color, or other optical attribute of the vehicle. In addition or alternatively, traffic signal controller 150 may also process the optical data to determine an identifier (e.g., a license plate number) associated with the vehicle and use the identifier to determine the associated vehicle type. In another example, an audio sensor (e.g., a microphone) may capture sounds associated with the vehicle, and traffic signal controller 150 may process the sounds to identify the vehicle type based on, for example, the volume, pitch, or other audio attribute of the vehicle.

In addition or alternatively, and also referring to FIG. 2A, traffic signal controller 150 may receive information submitted via user device 110. For example, a user may specify a current usage associated with the vehicle, and a vehicle type may be determined based on the identified usage. For example, if the data from vehicle telematics unit 120 identifies that the vehicle is a car, input from a current usage may identify whether the vehicle is being used as a passenger car, a carpool car or as a taxi cab.

Continuing with FIG. 5, process 500 may include determining a traffic signal configuration based on the vehicle type (block 520). For example, traffic signal controller 150 may configure a traffic signal based on different vehicle values associated with different vehicle types. For example, traffic signal controller 150 may sum vehicle values associated with first traffic (e.g., travelling in North/South directions) and sum vehicle values associated with second traffic (e.g., travelling in East/West directions), and determine cycling times based on a comparison of the sums. For example, if the sums associated with the first traffic and second traffic are similar (e.g., differ by less than 10%), the traffic signal controller 150 may assign the same or similar cycle times to the first traffic and the second traffic (e.g., one minute in each of the directions). Conversely, if the sums associated with the first traffic and second traffic are dissimilar (e.g., differ by at least 10%), the traffic signal controller 150 may control traffic signals to pass the first traffic and the second traffic with dissimilar cycle times. For example, the cycle time for each direction may be proportional to the sum of the vehicle values associated with a traffic flow in that direction.

In another example, a traffic signal may change from stop to go or vice versa when the sum of vehicles values associated with traffic waiting at an intersection exceeds a threshold value. In addition or alternatively, traffic signal may change from stop to go or vice versa when the quantity of vehicles waiting at an intersection exceeds a threshold value and/or a delay or the waiting vehicles exceeds a threshold time period.

Momentarily bypassing FIG. 6 and moving, instead, to FIG. 7, it shows an exemplary table that may be stored by traffic signal controller 150. Table 700 may include, for example, vehicle type entries 710 that identify different vehicle types and vehicle value entries 720 that identify different vehicle values associated with vehicle type entries 710. The values in vehicle value entries 720 may correspond, for example, to an expected number of people riding in a corresponding vehicle type. Thus, when configuring a traffic signal based on vehicle value entries 720, traffic signal controller 150 may prioritize certain vehicle types relative to other vehicle types based on the expected number or people in a vehicle. As shown in FIG. 7, vehicle type entries 710 of "Passenger Vehicle," "Carpool, "Bus" and "Van" may be associated with respective vehicle value entries 720 of 1, 4, 20 and 3.

Vehicle values 720 may also correspond to other factors. For example, a vehicle value entry 720 may be set to prioritize certain vehicle types. As shown in FIG. 7, a vehicle type entry 710 of an "Emergency Vehicle" may be associated with a vehicle value entry 720 of 1000000. Thus, the values in vehicle value entry 720 cause traffic signal controller 150 to prioritize certain vehicle types (e.g., an "Emergency Vehicle") or de-prioritize certain vehicle types (e.g., a vehicle type having a low vehicle value entry 720) relative to other vehicle types. For example, a significantly large vehicle entry 720 for an "Emergency Vehicle" may result in a vehicle value sum that causes a traffic signal to use cycle times and/or change, such that the traffic signal passes the Emergency Vehicle through an intersection with minimum delay.

In one implementation, traffic signal controller 150 may control multiple signals 150 concurrently. For example, traffic signal controller 150 may sum values in certain vehicle entries 720 associated with traffic passing through multiple traffic signals 130. Traffic signal controller 150 may coordinate the operation of the multiple traffic signals, for example, in order to minimize an average delay per expected passenger, to maximize a number of vehicles travelling through an intersection per time period, and/or people passing through an intersection per time period, etc. Traffic signal controller 150 may also coordinate the operation of multiple traffic signals, for example, in order to minimize a delay to emergency vehicles.

Continuing with FIG. 7, table 700 may further include additional vehicle value entries 730 that identify additional vehicle values that may be available to a vehicle in response, for example, to a request received from user device 110. For some vehicle types, the values in additional vehicle value entries 730 may correspond to the values in vehicle value entries 720. For example, vehicle type entries 710 of "Passenger Car," "Bus," and "Emergency Vehicle" may be associated with respective additional vehicle value entries 730 of 1, 20, and 1000000. Other vehicle type entries 710 may be associated with additional vehicle value entries 730 that do not correspond to the values in vehicle value entries 720. For example, vehicle type entries 710 of "Carpool" and "Van" may be associated with respective additional vehicle value entries 730 of 1 and 2, which do not match vehicle value entries 720 of 4 and 3, respectively.

The data in additional vehicle value entries 730 may be selected based on policy criteria. For example, additional vehicle value entries 730 may be selected such that a vehicle may occasionally submit a successful request to change the stop/go status of a traffic signal without causing excessive delays to other vehicles. The additional vehicle value entry 730 associated with an "Emergency Vehicle" may be selected such that traffic signal controller 150 may mediate between two emergency vehicles. For example, if two emergency vehicles are approaching an intersection in or from different directions, a user associated with one of the emergency vehicles may submit a request for higher priority. Traffic signal controller 150 may control a traffic signal to prioritize (e.g., minimize delay) the emergency vehicle associated with the submitted request.

Although FIG. 7 shows exemplary fields of table 700, in other implementations, table 700 may include different fields or additional fields than those depicted in FIG. 7. For example, table 700 may also identify different vehicle values assigned to different users.

Returning to FIG. 5, process 500 may include receiving a request to change a traffic signal (block 530). For example, the request may relate to an offer to pay a fee to change a traffic signal 130. As described above with respect to FIGS. 2B and 2C, user device 110 may provide an interface to receive an input requesting to change a traffic signal, and the request may be associated with a monetary value. For example, the request may be associated with a particular monetary value, or as described above with respect to FIG. 2C, a user may select from different possible values to associate with the request. In another implementation, user device 110 may automatically forward a request, for example, if an associated vehicle is in a particular area (e.g., travelling in a particular area specified by a user), if the vehicle is travelling at a particular time (e.g., during a time period specified by the user), or if the vehicle is delayed by the traffic signal more than a threshold amount of time.

In another implementation, the request received in process block 530 may relate to an offer to be, quite oppositely, further delayed by a traffic signal at an intersection. For example, a user may offer or volunteer to remain at the intersection for additional time in exchange for receiving a fee, which might be a credit to his/her account. Other forms of compensation for forgoing a priority right to pass through a traffic control device might include a token, stored in the user device of the vehicle that forewent the passage that can be used to pay for preferential treatment at another traffic control device.

Continuing with process 500, traffic signal controller 150 may determine whether to modify a traffic signal's configuration based on the request (block 540). A request may cause traffic signal controller 150 to change a vehicle value associated with a user device 110 forwarding the request. Traffic signal controller 150 may then determine whether the configuration of the traffic signal changes based on the changed vehicle value associated with the request. For example, traffic signal controller 150 may re-sum the vehicle values associated with traffic waiting at an intersection and determine whether to change the traffic signal and or to change the cycle times associated with the traffic signal.

It should be appreciated, however, that other methodologies may be used to determine whether to change a traffic signal in procedural block 540. In one example, a request may have a particular likelihood (or percentage) of successfully changing a traffic signal. For example, e.g., the request may cause a traffic signal to change 10 percent of the time. The likelihood of successfully changing a traffic signal may vary based on the vehicle type. For example, an emergency vehicle may be associated with a high likelihood of successfully changing a traffic signal (e.g., close to 100%). Thus, if a request is unsuccessful, another request may be submitted to attempt to the change traffic signal.

FIG. 6 is a flow chart of an exemplary process 600 for determining whether to modify a traffic signal's configuration based on the request in procedural block 540. In one implementation, process 600 may be performed by traffic signal controller 150. In other implementations, process 600 may be performed by one or more other devices of environment 100, such as user device 110 and/or vehicle telematics unit 120. Process 500 is described with reference to components in environment 100 shown in FIG. 1.

As shown in FIG. 6, process 600 may include determining whether a traffic signal would change without the request (block 610). Traffic signal controller 150 may determine whether, when the request was received, the traffic signal was already scheduled to change. For example, traffic signal controller 150 may determine whether the traffic signal was already scheduled, based on the cycling times, to change within a particular time period (e.g., within 10 seconds after receiving the request). In addition or alternatively, traffic signal controller 150 may determine whether a traffic conditions change (e.g., an arrival of a vehicle, such as an emergency vehicle, at an intersection) would trigger a change in the traffic signal absent the request. For example, traffic signal controller 150 may determine whether an updated sum of the vehicle values at an intersection exceeds a threshold value for changing the traffic signal.

If traffic signal controller 150 determines that the traffic signal would change without regard for the request (block 610—"YES"), traffic signal controller 150 may reject the request (block 620). If traffic signal controller 150 rejects the request, traffic signal controller 150 may send a rejection message to user device 110. Traffic signal controller 150 may also abstain from charging a fee for the request. For example, as described above with respect to FIGS. 2E and 2F, traffic signal controller 150 may forward a message to user device 110 indicating that the request was rejected.

If traffic signal controller 150 determines that the traffic signal would not change without regard for the request (block 610—"NO"), traffic signal controller 150 may adjust a vehicle value, associated with user device 110, based on the request (block 630). In one implementation, traffic signal controller 150 may determine the adjusted vehicle value based on the vehicle type associated with the request. For example, the adjusted vehicle value may correspond to additional vehicle value entries 730, in table 700, that correspond to vehicle type entries 710.

In another implementation, traffic signal controller 150 may add a particular amount to the vehicle value and/or may adjust the vehicle value by a multiplier (e.g., double the vehicle value). In one implementation, the change to the vehicle value may be a function of a monetary amount associated with the request. For example, traffic signal controller 150 may increase the vehicle value based on the monetary amount (e.g., add the monetary amount to the vehicle value) and/or may adjust the vehicle value by a multiple of the monetary amount.

Continuing with FIG. 6, traffic signal controller 150 may determine whether the adjusted vehicle value causes the traffic signal to change (block 640). For example, traffic signal controller 150 may determine whether an updated sum of the vehicle values at an intersection exceeds a threshold value for changing the traffic signal and/or causes a change to the cycling values. In one implementation, requests may be received from multiple vehicles at a traffic signals, and controller 150 may determine whether adjusted vehicle values for the multiple vehicles would initiate a change to the traffic signal.

If the adjusted vehicle value would not cause the traffic signal to change (block 640—"NO"), traffic signal controller 150 may reject the request (block 650). As described above with respect to FIGS. 2E and 2F, traffic signal controller 150 may receive a message from user device 110 to indicating whether to increase a monetary value associated with the request (block 660).

If the request is modified and the monetary value associated with the request is increased (block 660—"YES"), process 600 may return to procedural block 630, and traffic signal controller 150 may adjust a vehicle value, associated with user device 110, based on the increased monetary value (block 630). If the monetary value associated with the request is not increased (block 660—"No") [in combination with determining that the adjusted vehicle value would not cause the traffic signal to change (block 640—"No")], process 600 may end.

If the adjusted vehicle value would cause the traffic signal to change (block 640—"Yes"), traffic signal controller 150 may change the configuration of traffic signal and allocate a fee for request (block 670). For example, traffic signal controller 150 may forward instructions to a traffic signal 130 causing the traffic signal 130 to change and/or to implement modified cycling times. Traffic signal controller 150 may further allocate a fee (e.g., the amount associated with the request) to a user associated with user device 110. For example, the user may pay a balance amount, and the fee may be debited from the balance. As described above with respect to FIG. 2D, traffic signal controller 150 may forward a message to user device 110 indicating that the request was successful.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, in another implementation, traffic signal controller 150 may determine whether to accept the request based on other factors. For example, traffic signal controller 150 may determine to reject a request to change a traffic signal if the change would cause delay in excess of a particular value. In another implementation, signal controller 150 may determine to reject a request to change a traffic signal if, for example, data from vehicle telematics unit 120 indicates that the vehicle is being driven in an aggressive and/or unsafe manner (e.g., the vehicle is being driven at an excess velocity).

Also, while a series of blocks has been described with respect to FIGS. 5 and 6, the order of the blocks in processes 500 and 600 may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a processor, a request from a user device to change a traffic signal;
   identifying, by the processor, a vehicle type associated with the user device;
   determining, by the processor, a value associated with the vehicle type, wherein determining the value includes:
      determining an expected number of people associated with the vehicle type, and
      determining the value based on the expected number of people;
   determining, by the processor and based on the value, whether to change the traffic signal; and
   forwarding, by the processor, an instruction to the traffic signal based on the determining whether to change the traffic signal.

2. The method of claim 1, wherein the vehicle type corresponds to an emergency vehicle, and wherein determining the value includes:
   selecting the value to minimize a delay of the emergency vehicle caused by the traffic signal.

3. The method of claim 1, wherein determining whether to change the traffic signal includes:
   identifying a plurality of vehicles associated with the traffic signal;
   determining a sum of vehicle values for the plurality of vehicles;
   modifying the sum based on the value; and
   determining whether the modified sum satisfies a threshold value, wherein the traffic signal is changed when the modified sum satisfies the threshold value.

4. The method of claim 1, wherein the user device is associated with a vehicle, and wherein identifying the vehicle type associated with the user device further includes:
   receiving data collected by a vehicle telematics unit associated with the vehicle; and
   identifying the vehicle type based on the data.

5. The method of claim 1, wherein the request is associated with a first monetary value, and wherein the value is determined further based on the first monetary value.

6. The method of claim 5, wherein the method further comprises:
   sending a message to the user device based on determining not to change the traffic signal;
   receiving, from the user device and after sending the message, another request, wherein the other request is associated with a second monetary value; and
   determining, based on the second monetary value, whether to change the traffic signal.

7. The method of claim 5, wherein the method further comprises:
   allocating the first monetary value to the user device based on determining to change the traffic signal.

8. A system comprising:
   a memory configured to store vehicle values associated with a plurality of vehicle types; and
   a processor configured to:
      receive a request from a user device to change a traffic signal, wherein the request is associated with a first monetary value,
      identify a particular vehicle type, of the plurality of vehicle types, associated with the user device,
      modify a particular vehicle value, associated with the particular vehicle type, based on the request, wherein the processor is configured to modify the particular vehicle value based on the first monetary value, and
      determine, based on modified particular vehicle value, whether to change the traffic signal.

9. The system of claim 8, wherein the processor, when identifying the particular vehicle type associated with the user device, is further configured to:
   determine, based on the request, an identifier associated with the user device, and
   identify the particular vehicle type based on the identifier.

10. The system of claim 8, wherein the processor is further configured to:
   receive, from the user device and based on determining not to change the traffic signal, another request, wherein the other request is associated with a second monetary value, and
   determine, based on the second monetary value, whether to change the traffic signal.

11. The system of claim 8, wherein the processor, when determining whether to change the traffic signal, is further configured to:
   identify a plurality of vehicles associated with the traffic signal,
   determine a sum of vehicle values for the plurality of vehicles,
   modify the sum based on the modified particular vehicle value, and
   determine whether the modified sum satisfies a threshold value, wherein the processer determines to change the traffic signal when the modified sum satisfies the threshold value.

12. The system of claim 8, wherein the user device is associated with an emergency vehicle, and wherein the vehicle value is selected to minimize a delay to the emergency vehicle that is caused by the traffic signal.

13. The system of claim 8, wherein the processor, when identifying the particular vehicle type associated with the user device, is further configured to:
- receive data about a vehicle associated with the user device, and
- identify the particular vehicle type based on the data.

14. The system of claim 13, wherein the data about the vehicle includes data collected by a vehicle telematics unit associated with the vehicle.

15. A non-transitory computer readable medium to store instruction, the instructions comprising:
- one or more instructions that, when executed by a processor, cause the processor to:
  - receive a request from a user device to change a traffic signal,
  - identify a vehicle type associated with the user device, wherein the user device is associated with an emergency vehicle,
  - modify a vehicle value, associated with the vehicle type, based on the request, wherein the modified vehicle value is selected to minimize a delay to the emergency vehicle caused by the traffic signal, and
  - determine, based on modified vehicle value, whether to change the traffic signal.

16. The non-transitory computer readable medium of claim 15, wherein the vehicle value is determined based on an expected number of people associated with the vehicle type.

17. The non-transitory computer readable medium of claim 15, wherein the one or more instructions cause the processor, when determining whether to change the traffic signal, to further:
- identify a plurality of vehicles associated with the traffic signal;
- determine a sum of vehicle values for the plurality of vehicles;
- modify the sum based on the modified vehicle value; and
- determine whether the modified sum satisfies a threshold value, wherein the traffic signal is modified when the modified sum satisfies the threshold value.

18. The non-transitory computer readable medium of claim 15, wherein the user device is associated with a vehicle, and wherein the one or more instructions cause the processor, when identifying the vehicle type associated with the user device, to further:
- receive data collected by a vehicle telematics unit associated with the vehicle, and
- identify the vehicle type based on the data.

19. The non-transitory computer readable medium of claim 15, wherein the request is associated with a first monetary value, and wherein the vehicle value is modified based on the first monetary value.

20. The non-transitory computer readable medium of claim 19, wherein the instructions further comprise:
- one or more instructions that, when executed by the processor, cause the processor to:
  - send, to the user device, a message associated with determining to not change the traffic signal based on the request,
  - receive, from the user device and after sending the message, another request, wherein the other request is associated with a second monetary value, and
  - determine, based on the second monetary value, whether to change the traffic signal.

* * * * *